United States Patent [19]
Loza et al.

[11] Patent Number: 6,107,446
[45] Date of Patent: Aug. 22, 2000

[54] PROCESS FOR PREPARING POLYESTER RESINS

[75] Inventors: Roman Loza; Patricia McDaniel, both of Dublin, Ohio

[73] Assignee: Ashland Inc., Columbus, Ohio

[21] Appl. No.: 09/449,913

[22] Filed: Dec. 2, 1999

[51] Int. Cl.$^7$ ..................................................... C08G 63/02
[52] U.S. Cl. ........................ 528/272; 528/301; 528/306; 528/308; 528/308.6
[58] Field of Search .................................... 528/272, 301, 528/306, 308, 308.6

[56] References Cited

U.S. PATENT DOCUMENTS

| | | | |
|---|---|---|---|
| 2,478,015 | 8/1949 | Rust et al. ................................ | 260/77 |
| 3,547,898 | 12/1970 | Shapiro .................................. | 260/78.5 |
| 3,979,443 | 9/1976 | Schwartz et al. ....................... | 260/485 |
| 5,118,783 | 6/1992 | Raju ........................................ | 528/274 |

OTHER PUBLICATIONS

Chemical Abstracts 35–Chemistry of Synthetic High Polymers, vol. 124, No. 14, 1996, p. 28, 124:177316n Polymerizable fumaric acid ester derivatives. Murata, Naoyuki; Nagase, Koyoko; Yokoyama, Naoki (Daihachi Chem Ind).

*Primary Examiner*—Samuel A. Acquah
*Attorney, Agent, or Firm*—Martin Connaughton

[57] ABSTRACT

The invention relates to a process for preparing polyester resins by first reacting a carboxylic acid or its corresponding anhydride with a saturated monohydric alcohol to form the half ester and then reacting the half ester with a polyol.

10 Claims, No Drawings

PROCESS FOR PREPARING POLYESTER RESINS

CROSS REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present invention relates to a process for preparing polyester resins. According to the process a carboxylic acid or corresponding anhydride containing ethylenic unsaturation is first reacted with a saturated, monohydric alcohol to form the half ester of the acid or anhydride. The half ester is then reacted with a polyol to form the polyester.

In general unsaturated polyesters are prepared from dicarboxylic functional monomers, or mixture of di- or greater carboxyl functional monomers where at least one of which contains ethylenic unsaturation. These polyesters are obtained by the condensation of the carboxylic acid monomers with polyhydric alcohols. Commercially, the polyester is dissolved in a monomer such as styrene to obtain a solution that may then be crosslinked.

U.S. Pat. No. 2,478,015 discloses a process for the preparation of unsaturated polyesters by reacting the monoester of a beta-unsaturated monohydric alcohol and polycarboxylic acid with a polyhydric alcohol. Examples of the unsaturated alcohols include allyl alcohol, methallyl alcohol, crotyl alcohol, etc. Beta-unsaturated alcohols such as allyl alcohol are toxic and esters prepared using such alcohols have a tendency to gel. U.S. Pat. No. 3,547,898 discloses a process for the production of resins containing maleic half esters. In this process maleic acid or anhydride is reacted with a monoalkyl or alkaryl ethoxylate having from 4 to 15 carbon atoms in the alkyl or aralkyl group. An alcohol such as methanol may also be added to the reaction mixture. The reaction product is then dissolved in a monomer with a free radical initiator aralkyl group. An alcohol such as methanol may also be added to the reaction mixture. The reaction product is then dissolved in a monomer with a free radical initiator present. U.S. Pat. No. 3,979,443 discloses the preparation of monohydric alcohol esters of maleic acid. U.S. Pat. No. 5,118,783 discloses a process for preparing low molecular weight unsaturated polyesters by adding a monofunctional alcohol to the condensation reaction of dicarboxylic acids and polyhydric alcohol. Japanese Patent No. 2,863,896 discloses a process for the preparation of an ester derivative useful as a cross linking improver for polymers. The abstract of the '896 patent discloses reacting maleic anhydride with isopropanol, isomerizing the reaction product to give monoisopropyl fumarate and reacting that fumarate with a bisphenol A derivative at a temperature of 120°.

Styrene, a solvent used to prepare solutions of unsaturated polyesters is considered a hazardous pollutant. Much work has been done in an effort to prepare low volatile organic compound (VOC) unsaturated polyester resin systems. One area of focus has been the use of waxes as a means of reducing emissions. During cure waxes which are initially dissolved or dispersed in a resin, form a thin film on the surface of the fabricated article. The film acts as a physical barrier preventing styrene from evaporating from the surface of the curing part. This film reduces styrene emissions. Unfortunately the waxy film substantially diminishes interlaminar adhesion thus reducing the strength of molded articles made using a multilaminate construction. An alternative to the use of waxes is the use of low molecular weight unsaturated polyester resins. The lower molecular weight permits the use of less styrene because of increased solubility of the resin in the styrene. Typically the molecular weight of unsaturated polyester resins is manipulated by altering the ratios of components. The highest molecular weight is achieved when a 1:1 ratio of acid to polyol is used. Increasing the ratio of one component in relation to the other lowers the molecular weight. However, these synthesis techniques significantly change the performance characteristics of the resulting products. For example, using more polyol than acid can significantly reduce the reactivity and/or thermal resistance of a product. Using more acid than polyol will increase the reactivity but the acid value (AV) of the product also increases. High AV resins are not very soluble in styrene and tend to precipitate in styrene. Articles molded from these resins are susceptible to attack by water. Simply changing molecular weight without modifying the nature of the end groups diminishes the suitability of the resins for many applications.

Unlike standard methods for the preparation of unsaturated polyester resins the invention provides a method of preparation yielding resins having both a low viscosity and acid value. Resins prepared according to the invention are more soluble in styrene while still retaining good performance characteristics. Because the resins are more soluble less styrene is necessary to prepare a styrene resin solution. Reducing the styrene content allows manufacturers to continue to use conventional open mold techniques while reducing styrene emissions.

BRIEF SUMMARY OF THE INVENTION

The invention relates to a process for preparing unsaturated polyester resins. According to the process at least one carboxylic acid or its corresponding anhydride containing ethylenic unsaturation is first reacted with at least one low molecular weight, saturated monohydric alcohol to form the half ester. The half ester is then reacted with at least one polyhydric alcohol in a condensation reaction. The process of the present invention yields a final product having a low acid value. Resins prepared according to the invention have acid values below 50 mg KOH/g and preferably below 30 mg KOH/g. The resins prepared according to the invention having low acid values are more soluble in styrene than comparable resins prepared using a standard ester resin synthesis process where a carboxylic acid and polyol are reacted without first reacting the acid with a saturated monohydric alcohol. Polyester resins prepared according to the invention have performance characteristics as good or better than polyester resins prepared by traditional methods.

BRIEF DESCRIPTION OF THE SEVERAL VIEWS OF THE DRAWING

Not Applicable.

DETAILED DESCRIPTION OF THE INVENTION

The invention relates to a process for preparing polyester resins. According to the process a carboxylic acid having at least two carboxyl functional groups or its corresponding anhydride containing ethylenic unsaturation is first reacted with a saturated, monohydric alcohol having a boiling point of less than about 150° C. to form the half ester of the carboxylic acid or corresponding anhydride. The half ester is then reacted with polyol in a condensation reaction. The polyol can be added all at once or incrementally over a period of time. Optionally catalysts can be added to promote the condensation reaction. After the polyol addition has begun the polyol/half ester mixture is allowed to react with heating. Distillate composed of water and the saturated monohydric alcohol used to prepare the half ester is removed from the reaction. Heating is continued until the desired viscosity is reached. If polyol is added incrementally, the addition should be completed before the target viscosity is attained in order to minimize the amount of unreacted polyol in the final product. In each case the crboxylic acid or its corresponding anhydride, the saturated monohydric alcohol and the polyol can be mixture. For example, the saturated monohydric alcohol can be a mixture of ethanol and methanol.

Examples of carboxylic acids and corresponding anhydrides useful in the invention include maleic acid, fumaric acid, itaconic acid and maleic anhydride. In addition other acids, anhydrides or esters of the acids can be added to modify the chemical composition. Examples of such acids and anhydrides include phthalic acid, isophthalic acid, terephthalic acid, tetrahydrophthalic anhydride, phthalic anhydride, nadic anhydride, methylnadic anhydride, hexahydrophthalic anhydride, dimethyl terephthalate and the like. Maleic acid and maleic anhydride are preferred.

Examples of saturated monohydric alcohols having a boiling point of less than about 150° C. at standard temperature and pressure include methanol, ethanol, 1-propanol, 2-propanol, 1-butanol, 2-butanol and the like. Primary alcohols such as methanol and ethanol are preferred.

A wide variety of polyols can be used in the process of the invention. Included would be common diols such as ethylene glycol, propylene glycol, 1,3-propanediol, 1,4-propanediol, 1,4-butanediol, 2,2-dimethyl-1,3-propanediol, 2-methyl-1,3-propanediol, glycol ethers such as diethylene glycol and dipropylene glycol, and polyoxyalkylene glycols like polyoxyethylene glycol and polyoxypropylene glycol. Triols and higher functional polyols such as glycerol, trimethylol propane and oxyalkylated adducts thereof can also be used. Preferably, the polyols are aliphatic or alicyclic and optionally contain C—O—C linkages.

Other materials commonly used in the synthesis of unsaturated polyester resins, such as solvents, isomerization and/or condensation catalyst, promoters, etc. can be used in the process of the invention. Examples of solvents are those commonly known in the art and include but are not limited to hexane, cyclohexane, benzene, toluene, xylene, and mixtures of solvents. Commonly used inhibitors include hydroquinone, p-benzoquinone, di-t-butylhydroquinone, t-butylcatechol, phenothiazine, and the like. Catalysts used to promote the condensation reaction include p-toluene sulfonic acid, methane sulfonic acid, zinc salts (e.g. acetate), organotin compounds (dibutyl oxide) and other materials known to those skilled in the art. Isomerization catalysts include organic amines such as morpholine and piperidine.

Unlike traditional unsaturated polyester resin synthesis processes in which an ethylenically unsaturated polycarboxylic acid is reacted with polyol, the process of the invention uses the reaction of a half ester and a polyol to form the desired unsaturated polyester resins. Typically, a mole ratio of 0.5 to 1.0 moles of saturated monohydric alcohol to acid or anhydride is used. In a preferred embodiment the half ester is made by reacting one mole of maleic anhydride with one mole of a saturated monohydric alcohol, such as methanol, ethanol, 1-propanol, 1-butanol and the like. The maleate half ester can be made at subambient, ambient, or superambient temperature and pressure. The reaction conditions are adjusted so that a substantial amount (50% to 75% of the theoretical conversion to the half ester) of the half ester forms prior to the addition of the polyol. Primary alcohols such as methanol and ethanol require little or no heat input to facilitate the formation of the half ester. Secondary alcohols such as 2-propanol may require additional heat to facilitate the formation of the half ester. Depending on the size and configuration of the reaction vessel some cooling capacity may be required to maintain a safe operating temperature and pressure. The reaction of the alcohol and acid or corresponding anhydride is carried out at a temperature of from ambient to 180° C. preferably from ambient to 160° C.

When a substantial amount of half ester is formed, polyol is added to the reaction vessel. Optionally, the half ester can be transferred to a second vessel containing the polyol. The polyol and maleate half ester can be combined at once, incrementally, or continuously over time. The polyol to half ester mole ratio is adjusted to between 0.5 and 1.75, preferably between 0.65 and 1.50 and most preferably between 0.5 and 1.25. If other acids are introduced in addition to the anhydride the amount of maleate half ester is adjusted so that the total polyol to diacid ratio is within the ranges given above. Heating can be applied to the contents of the reaction vessel during addition of the reaction components or on completion of the addition. The reaction of the half ester and polyol is carried out at a temperature of from 160° C. to 240° C. preferably from 180° C. to 220° C. During the esterification distillate consisting of water and alcohol is continuously removed.

Both the degree of conversion and the composition of the reaction mixture can be used to control the viscosity of the final product. Typically, the higher the polyol to half ester ratio the lower the viscosity. Time at temperature can also be used to control the viscosity. During the course of the condensation the viscosity is monitored using the Gardener-Holdt method (ASTM D1545-89 recorded in seconds or stokes). The acid value is monitored using ASTM D1639-90. Resins having both a low viscosity and acid value can be made using only a slight excess of polyol to half ester (1.1:1.0) or slight excess of half ester (0.9:1.0 polyol to half ester) mole ratio. Having thus described the invention the following examples are given by way of illustration and should in no way be construed as limiting in nature.

In the following examples, several polyester resins were prepared. For comparison an analogous series of resins were prepared using a traditional synthesis process.

Polyester resins were also made using 2-ethylhexanol as an endcapping agent as outlined in U.S. Pat. No. 5,118,783. In each example the finished resin was diluted with styrene to make a 66% nonvolatiles solution (ASTM D1644-88). 0.2 phr(parts per hundred) of 6% cobalt naphthanate, 0.1 phr of dimethylanaline (DMA) and 1.5 phr of Lupersol DDM-9 methyl ethyl ketone peroxide solution were added to each resin sample. Each solution was degassed and poured into a mold comprised of two glass plates separated by a ⅛" silicone rubber gasket. Each casting was removed from the mold after about 36 hours at ambient temperature and post cured between glass plates for 2 hours at 300° F. After post curing each casting was cut into test specimens. Tensile strength, modulus and elongation were measured using ASTM method D638. HDT was measured using ASTM method D648-97. Barcol hardness was measured using ASTM method D2583-92. Test coupons (1"×4") were also cut for testing water boil(WB) resistance. Test coupons were immersed in boiling water for 3–14 days. The test coupons were weighed before(initial weight) and after (wet weight) exposure. They were then placed on a glass plate and dried for 6 hr at 120° C. in a forced air oven. After cooling each coupon was weighed again (final weight). The final weight and the initial weight were used to calculate the amount of material extracted. And the final weight and the wet weight were used to calculate the amount of water absorbed. The physical appearance of the dried coupons was ranked on a scale of 0–9: where 0=no physical change (NC); 9=severe blistering (B) and/or cracking (C).

COMPARATIVE EXAMPLE C1A

Standard Polyester (SP-DPG-90)

Dipropylene glycol (DPG), 246 g, (1.83 mol) and maleic anhydride, 400 g, (4.08 mol), were reacted together at 79° C. for about 3 h. Additional DPG, 246 g, (1.83 mol), inhibitor, and piperidine, 0.67 g, (7.8 m mol) were added and the mixture was heated to 400° F. Water of condensation was collected and polycondensation was continued until a 21.2-sec. Gardner-Holt viscosity was reached (80% solution in styrene). The mixture was cooled to about 175° F. and blended with styrene containing inhibitor. The polyol to maleic ratio for this resin was 0.9:1. The resin was only partially soluble in styrene. A precipitate formed when the mixture was blended with styrene. Resin castings were hazy. Properties of a neat resin casting made from this material are given in Table 1.

COMPARATIVE EXAMPLE C1B

End-capping With 2-ethylhexanol (EH-DPG-90)

Dipropylene glycol (DPG), 209 g, (1.56 mol), 2-ethylhexanol, 90.8 g, (0.7 mol) and maleic anhydride, 450 g, (4.59 mol), were reacted together at 79° C. for about 3 h. Additional DPG, 345 g, (2.57 mol), inhibitor, and piperidine, 0.67 g, (7.8 mmol) were added and the mixture was heated to 400° F. Water of condensation along with a small amount of 2-ethyl hexanol (10.4 g) was collected and polycondensation was continued until a 23.7-sec. Gardner-Holt viscosity was reached (80% solution in styrene). The mixture was cooled to about 175° F. and blended with styrene containing inhibitor. The polyol to maleic ratio for this resin was 0.9:1. Resin properties are given in Table 1.

EXAMPLE 1A

High Maleate Resin Made Using Ethanol (EHM-DPG-90)

Maleic anhydride, 400 g, (4.08 mol) and 95% ethanol, 196.3 g, (4.08 mol) were reacted at 175° F. over the course of about 2 h. Slow addition of ethanol was used to control temperature. Next, dipropylene glycol (DPG), 246 g, (1.83 mol) and inhibitor were added and the mixture was heated to 400° F. A mixture of ethanol and water distilled as the temperature rose. When distillation ceased the mixture was cooled to about 300° F. Additional DPG, 246 g, (1.83 mol), inhibitor, and piperidine, 0.63 g, (7.4 mmol) were added and the mixture was heated to 400° F. Again a mixture of water and ethanol distilled off. Polycondensation was continued until a 23.5 sec. Gardner-Holt viscosity was reached (80% solution in styrene). The mixture was cooled to about 175° F. and blended with styrene containing inhibitor. The polyol to maleic ratio for this resin was 0.9:1. Properties of this resin are given in Table 1

EXAMPLE 1B

High Maleate Resin Made Using Methanol (MHM-DPG-90)

A procedure similar to the one used for preparing the EHM-DPG-90 material (Example 1-A) was used except that methanol was used in place of the ethanol. Properties are given in Table 1.

COMPARATIVE EXAMPLE C1C

Endcapping With 2-ethylhexanol

A procedure similar to the one used for preparing the EHM-DPG-90 material (Example 1-A) was used except that 2-ethylhexanol was used in place of the ethanol. Since the 2-ethylhexanol is not volatile it was not removed during the reaction and the Gardner-Holt viscosity never rose above 0.5 sec. This resin was not evaluated.

Table 1

Comparative Examples C1A and C1B and Examples 1A and 1B. Examples of resins with a 0.9 to 1 Polyol to Acid Ratio

TABLE 1

Comparative Example C1A and C1B and Example 1A and 1B.
Examples of resins with a 0.9 to 1 Polyol to Acid Ratio.

| | Acid Value | Viscosity, cps | % V.O.C. | Physical Properties | |
|---|---|---|---|---|---|
| Comparative Example C1A | 97 | 265 | 66 | Barcol hardness | 41 |
| | | | | tensile strength, psi | 7,797 |
| | | | | tensile modulus, ksi | 508 |
| | | | | elongation, % | 2.0 |
| | | | | HDT, ° C. | 111 |
| | | | | % Extracted in 6d Water Boil | 4.50 |
| | | | | % Water absorbed in 6d Water Boil | 6.90 |
| | | | | Appearance of Sample | 9-B&C |
| Comparative Example C1B | 37 | 290 | 66 | Barcol hardness | 34 |
| | | | | tensile strength, psi | 6,977 |
| | | | | tensile modulus, ksi | 396 |
| | | | | elongation, % | 2.2 |
| | | | | HDT, ° C. | 115 |

TABLE 1-continued

Comparative Example C1A and C1B and Example 1A and 1B.
Examples of resins with a 0.9 to 1 Polyol to Acid Ratio.

|  | Acid Value | Viscosity, cps | % V.O.C. | Physical Properties | |
|---|---|---|---|---|---|
| Example 1A | 26 | 321 | 66 | % Extracted in 6d Water Boil | 0.10 |
|  |  |  |  | % Water absorbed in 6d Water Boil | 3.30 |
|  |  |  |  | Appearance of Sample | 2-B |
|  |  |  |  | Barcol hardness | 37 |
|  |  |  |  | tensile strength, psi | 7,975 |
|  |  |  |  | tensile modulus, ksi | 450 |
|  |  |  |  | elongation, % | 2.4 |
|  |  |  |  | HDT, ° C. | 119 |
|  |  |  |  | % Extracted in 6d Water Boil | 0.30 |
|  |  |  |  | % Water absorbed in 6d Water Boil | 3.30 |
|  |  |  |  | Appearance of Sample | 0-NC |
| Example 1B | 26 | 286 | 66 | Barcol hardness | 38 |
|  |  |  |  | tensile strength, psi | 8,249 |
|  |  |  |  | tensile modulus, ksi | 427 |
|  |  |  |  | elongation, % | 2.7 |
|  |  |  |  | HDT, ° C. | 121 |
|  |  |  |  | % Extracted in 6d Water Boil | 0.20 |
|  |  |  |  | % Water absorbed in 6d Water Boil | 3.70 |
|  |  |  |  | Appearance of Sample | 0-NC |

COMPARATIVE EXAMPLE C2A

Standard Polyester (SP-DPG-100)

Dipropylene glycol (DPG), 273 g, (2.04 mol) and maleic anhydride, 400 g, (4.08 mol), were reacted together at 79° C. for about 3 h. Additional DPG, 273 g, (2.04 mol), inhibitor, and piperidine, 0.71 g, (8.3 mmol) were added and the mixture was heated to 400° F. Water of condensation was collected and polycondensation was continued until a 10.1 sec. Gardner-Holt viscosity was reached (80% solution in styrene). The mixture was cooled to about 175° F. and blended with styrene containing inhibitor. The polyol to maleic ratio for this resin was 1.0:1. The resin was only partially soluble in styrene. A precipitate formed when the resin was added to the styrene. Resin castings were hazy. Properties of a neat resin casting made from this material are given in Table 2.

COMPARATIVE EXAMPLE C2B

End-capping With 2-ethylhexanol (EH-DPG-100)

Dipropylene glycol (DPG), 218 g, (1.63 mol), 2-ethylhexanol, 86.6 g, (0.67 mol) and maleic anhydride, 450 g, (4.59 mol), were reacted together at 79° C. for about 3 h. Additional DPG, 397 g, (2.96 mol), inhibitor, and piperidine, 0.86 g, (10.0 mmol) were added and the mixture was heated to 400° F. Water of condensation along with a small amount of 2-ethyl hexanol (15.8 g) was collected and polycondensation was continued until a 9.5 sec. Gardner-Holt viscosity was reached (80% solution in styrene). The mixture was cooled to about 175° F. and blended with styrene containing inhibitor. The polyol to maleic ratio for this resin was 1.0:1. Resin properties are given in Table 2.

EXAMPLE 2A

High Maleate Resin Made Using Ethanol (EHM-DPG-100)
Addition of Polyol in Two Charges Maleic anhydride, 450 g, (4.59 mol) and 95% ethanol, 220.8 g, (4.79 mol) were reacted at 175° F. over the course of about 2 h. Slow addition of ethanol was used to control temperature. Next, dipropylene glycol (DPG), 307.8 g, (2.29 mol) and inhibitor were added and the mixture was heated. A mixture of ethanol and water distilled as the temperature rose. When distillation ceased the mixture was cooled to about 300° F. Additional DPG, 307.8 g, (2.29 mol), inhibitor, and piperidine, 0.96 g, (11.2 mmol) were added and the mixture was heated to 400° F. Again a mixture of water and ethanol distilled off. Polycondensation was continued until a 9.5 sec. Gardner-Holt viscosity was reached (80% solution in styrene). The mixture was cooled to about 175° F. and blended with styrene containing inhibitor. The polyol to maleic ratio for this resin was 1.0:1. Resin properties are given in Table 2.

EXAMPLE 2B

High Maleate Resin Made Using Ethanol (EHM-DPG-100)

Addition of Polyol in One Charge

Maleic anhydride, 450 g, (4.59 mol) and 95% ethanol, 220.8 g, (4.79 mol) were reacted at 175° F. over the course of about 2 h. Slow addition of ethanol was used to control temperature. Next, dipropylene glycol (DPG), 616 g, (2.29 mol) inhibitor, and piperidine, 0.96 g, (11.2 mmol) were added and the mixture was heated. A mixture of ethanol and water distilled as the temperature rose. Polycondensation was continued until a 10.1-sec. Gardner-Holt viscosity was reached (80% solution in styrene). The acid value was 11. The polyol to maleic ratio for this resin was 1.0:1.

EXAMPLE 2C

High Maleate Resin Made Using Methanol (MHM-DPG-90)

A procedure similar to the one used for preparing the EHM-DPG-100 material (Example 2-A) was used except that methanol was used in place of the ethanol. Properties are given in Table 2.

TABLE 2

Comparative Example C2A and C2C and Example 2A and 2B.

| | Acid Value | Viscosity, cps | % V.O.C. | Physical Properties | |
|---|---|---|---|---|---|
| Comparative Example C2A | 83 | 185 | 66 | Barcol hardness | 36 |
| | | | | tensile strength, psi | 8,647 |
| | | | | tensile modulus, ksi | 419 |
| | | | | elongation, % | 3.8 |
| | | | | HDT, ° C. | 86 |
| | | | | % Extracted in 6d Water Boil | 6.47 |
| | | | | % Water absorbed in 6d Water Boil | 7.67 |
| | | | | Appearance of Sample | 9-B&C |
| Comparative Example C2B | 39 | 148 | 66 | Barcol hardness | 32 |
| | | | | tensile strength, psi | 7.107 |
| | | | | tensile modulus, ksi | 365 |
| | | | | elongation, % | 2.9 |
| | | | | HDT, ° C. | 99 |
| | | | | % Extracted in 6d Water Boil | 0.30 |
| | | | | % Water absorbed in 6d Water Boil | 3.30 |
| | | | | Appearance of Sample | 3-B |
| Example 2A | 27 | 172 | 66 | Barcol hardness | 36 |
| | | | | tensile strength, psi | 8,162 |
| | | | | tensile modulus, ksi | 395 |
| | | | | elongation, % | 3.4 |
| | | | | HDT, ° C. | 101 |
| | | | | % Extracted in 6d Water Boil | 0.51 |
| | | | | % Water absorbed in 6d Water Boil | 3.45 |
| | | | | Appearance of Sample | 0-NC |
| Example 2C | 26 | 286 | 66 | Barcol hardness | 38 |
| | | | | tensile strength, psi | 8,132 |
| | | | | tensile modulus, ksi | 421 |
| | | | | elongation, % | 3.1 |
| | | | | HDT, ° C. | 104 |
| | | | | % Extracted in 6d Water Boil | 0.62 |
| | | | | % Water absorbed in 6d Water Boil | 3.41 |
| | | | | Appearance of Sample | 0-NC |

COMPARATIVE EXAMPLE C3A

Standard Polyester (SP-DPG-110)

Dipropylene glycol (DPG), 301 g, (2.24 mol) and maleic anhydride, 400 g, (4.08 mol), were reacted together at 79° C. for about 3 h. Additional DPG, 301 g, (2.24 mol), inhibitor, and piperidine, 0.75 g, (8.7 mmol) were added and the mixture was heated to 400° F. Water of condensation was collected and polycondensation was continued until a 9.2-sec. Gardner-Holt viscosity was reached (80% solution in styrene). The mixture was cooled to about 175° F. and blended with styrene containing inhibitor. The polyol to maleic ratio for this resin was 1.1:1. Properties of a neat resin casting made from this material are given in Table 3.

COMPARATIVE EXAMPLE C3B

End-capping With 2-ethylhexanol (EH-DPG-110)

Dipropylene glycol (DPG), 233 g, (1.73 mol), 2-ethylhexanol, 86.6 g, (0.67 mol) and maleic anhydride, 450 g, (4.59 mol), were reacted together at 79° C for about 3 h. Additional DPG, 445 g, (3.31 mol), inhibitor, and piperidine, 0.90 g, (10.0 mmol) were added and the mixture was heated to 400° F. Water of condensation along with a small amount of 2-ethyl hexanol (13.0 g) was collected and polycondensation was continued until a 6.1-sec. Gardner-Holt viscosity was reached (80% solution in styrene). The mixture was cooled to about 175° F. and blended with styrene containing inhibitor. The polyol to maleic ratio for this resin was 1.1:1. Resin properties are given in Table 3.

EXAMPLE 3A

High Maleate Resin Made Using Ethanol (EHM-DPG-110)

Maleic anhydride, 450 g, (4.59 mol) and 95% ethanol, 220.8 g, (4.79 mol) were reacted at 175° F. over the course of about 2 h. Slow addition of ethanol was used to control temperature. Next, dipropylene glycol (DPG), 307.8 g, (2.29 mol) and inhibitor were added and the mixture was heated. A mixture of ethanol and water distilled as the temperature rose. When distillation ceased the mixture was cooled to about 300° F. Additional DPG, 307.8 g, (2.29 mol), inhibitor, and piperidine, 0.96 g, (11.2 mmol) were added and the mixture was heated to 400° F. Again a mixture of water and ethanol distilled off. Polycondensation was continued until a 9.5-sec. Gardner-Holt viscosity was reached (80% solution in styrene). The mixture was cooled to about 175° F. and blended with styrene containing inhibitor. The polyol to maleic ratio for this resin was 1.1:1. Resin properties are given in Table 3.

TABLE 3

Comparative Example C3A and C3B and Example 3.

| | Acid Value | Viscosity, cps | % V.O.C. | Physical Properties | |
|---|---|---|---|---|---|
| Comparative Example C3A | 52 | 168 | 66 | Barcol hardness | 27 |
| | | | | tensile strength, psi | 7,635 |

TABLE 3-continued

Comparative Example C3A and C3B and Example 3.

|  | Acid Value | Viscosity, cps | % V.O.C. | Physical Properties | |
|---|---|---|---|---|---|
|  |  |  |  | tensile modulus, ksi | 364 |
|  |  |  |  | elongation, % | 4.5 |
|  |  |  |  | HDT, ° C. | 76 |
|  |  |  |  | % Extracted in 3d Water Boil | 3.17 |
|  |  |  |  | % Water absorbed in 3d Water Boil | 5.16 |
|  |  |  |  | Appearance of Sample | 9-B&C |
| Comparative Example C3B | 29 | 133 | 66 | Barcol hardness | 25 |
|  |  |  |  | tensile strength, psi | 6,665 |
|  |  |  |  | tensile modulus, ksi | 314 |
|  |  |  |  | elongation, % | 3.7 |
|  |  |  |  | HDT, ° C. | 99 |
|  |  |  |  | % Extracted in 3d Water Boil | 1.40 |
|  |  |  |  | % Water absorbed in 3d Water Boil | 4.50 |
|  |  |  |  | Appearance of Sample | 9-B&C |
| Example 3 | 20 | 131 | 66 | Barcol hardness | 27 |
|  |  |  |  | tensile strength, psi | 7,455 |
|  |  |  |  | tensile modulus, ksi | 370 |
|  |  |  |  | elongation, % | 3.6 |
|  |  |  |  | HDT, ° C. | 93 |
|  |  |  |  | % Extracted in 3d Water Boil | 0.70 |
|  |  |  |  | % Water absorbed in 3d Water Boil | 3.76 |
|  |  |  |  | Appearance of Sample | 3-B |

EXAMPLES 4, 5 and 6

Demonstrate the Use of Mixtures of Anhydrides in the Process of this Invention

EXAMPLE 4

High Maleate Resin Made Using Ethanol and Phthalic Anhydride

Phthalic anhydride, 351.7 g, (2.37 mol), maleic anhydride, 350 g, (3.57 mol) and 95% ethanol, 288.1 g, (6.21 mol) were reacted at 175° F. over the course of about 2 h. Slow addition of ethanol was used to control temperature. Next, 2-methyl-1,3-propanediol, 274.4 g, (3.05 mol) and inhibitor were added and the mixture was heated. A mixture of ethanol and water distilled as the temperature rose. When distillation ceased the mixture was cooled to about 300° F. Additional 2-methy-1,3-propanediol, 274.4 g, (3.05 mol) and inhibitor were added and the mixture was heated to 400° F. Again a mixture of water and ethanol distilled off. Polycondensation was continued until a 4.7-sec. Gardner-Holt viscosity was reached (70% solution in styrene). The mixture was cooled to about 175° F. and blended with styrene containing inhibitor. The product had an acid value of 9.

EXAMPLE 5

High Maleate Resin Made Using Ethanol and Tetrahydrophthalic Anhydride

Tetrahydrophthalic anhydride, 206.5 g, (1.36 mol), maleic anhydride, 450 g, (4.59 mol) and 95% ethanol, 286.2 g, (6.21 mol) were reacted at 175° F. over the course of about 2 h. Slow addition of ethanol was used to control temperature. Next, 2-butyl-2-ethyl-1,3-propanediol, 95.3 g, (0.59 mol) and 2,2-dimethyl-1,3-propanediol, 247.6 g, (2.38 mol) and inhibitor were added and the mixture was heated. A mixture of ethanol and water distilled as the temperature rose. When distillation ceased the mixture was cooled to about 300° F. Additional 2-butyl-2-ethyl-1,3-propanediol, 104.8 g, (0.65 mol) and 2,2-dimethy-1,3-propanediol, 272.4 g, (2.62 mol), piperidine, 1.01 g, (11.7 mmol) and inhibitor were added and the mixture was heated to 400° F. Again a mixture of water and ethanol distilled off. Polycondensation was continued until a 4.5-sec. Gardner-Holt viscosity was reached (70% solution in styrene). The mixture was cooled to about 175° F. and blended with styrene containing inhibitor. The product had an acid value of 10.

The following example illustrates the incorporation of aromatic diacids into unsaturated polyesters made by the High-Maleate process using aromatic polyester polyols.

EXAMPLE 6

High Maleate Resin Made Using Diester of Isophthalic Acid as Part of the Polyol Charge Isophthalic acid, 650 g, (3.91 mol), diethylene glycol, 415 g, (3.91 mol), ethylene glycol, 243 g (3.91 mole), and dibutyltin oxide, 0.26 g, were heated to 420° F. with slow distillation of water. When the acid value dropped below 10 the reaction was stopped and the isophthalic diester product, was collected as a highly viscous fluid. It had an acid value of 9 and a hydroxyl value of 362.

Next, maleic anhydride, 400 g, (4.08 mol) and 95% ethanol, 196.3 g, (4.08 mol) were reacted at 175° F. over the course of about 2 h. Slow addition of ethanol was used to control temperature. The isophthalic diester, 545 g, was added along with inhibitor and the mixture was heated. A mixture of ethanol and water distilled as the temperature rose. When distillation ceased the mixture was cooled to about 300° F. Diethylene glycol, 199 g, piperidine, 0.90 g, (10.5 mmol) and inhibitor were added and the mixture was heated to 400° F. Again a mixture of water and ethanol distilled off. Polycondensation was continued until a 7.5-sec. Gardner-Holt viscosity was reached (70% solution in styrene). The mixture was cooled to about 175° F. and blended with styrene containing inhibitor. The product had an acid value of 19 and a hydroxyl value of 26.

What is claimed is:

1. A process for preparing a polyester resin, consisting essentially of;

A. in a first step, reacting a carboxylic acid having at least two carboxyl functional groups or its corresponding anhydride containing ethylenic unsaturation with a saturated, monohydric alcohol having a boiling point of less than about 150° C. in an amount sufficient to obtain a half ester of the dicarboxylic acid or its corresponding anhydride, and B. in a second step, reacting the half ester with a polyol.

2. The process as claimed in claim 1 where the carboxylic acid or its corresponding anhydride is maleic acid, fumaric acid, maleic anhydride or mixtures thereof.

3. The process as claimed in claim 1 where the saturated monohydric alcohol is methanol, ethanol, 1-propanol, 2-propanol, 1-butanol, 2-butanol or mixtures thereof.

4. The process as claimed in claim 1 where the polyol is an alkylene glycol, polyoxyalkylene glycol, or mixtures thereof.

5. The process as claimed in claim 1 where in the first step an aromatic dicarboxylic acid, its corresponding anhydride or mono- or diester is added to the reaction.

6. The process as claimed in claim 5 where the aromatic dicarboxylic acid, its corresponding anhydride or mono- or diester is isophthalic acid, terephthalic acid, phthalic anhydride, and mixtures thereof.

7. The process as claimed in claim 1 where the polyester resin has an acid value of less than about 50 mgKOH/g.

8. The process as claimed in claim 1 where the polyester resin has an acid value of less than about 30 mgKOH/g.

9. A process for preparing a polyester resin, comprising;

A. in a first step reacting a dicarboxylic acid or its corresponding anhydride selected from the group consisting of; maleic acid, fumaric acid and maleic anhydride with a saturated monohydric alcohol selected from the group consisting of; methanol, and ethanol to obtain the half ester, and B. in a second step reacting the half ester with a polyol selected from the group consisting of; ethylene glycol, propylene glycol, 1,3-propanediol, 1,4-butanediol, 2,2-dimethyl-1,3-propanediol, 2-methyl-1,3-propanediol, diethylene glycol, dipropylene glycol, polyoxyethylene glycol, and polyoxypropylene glycol.

10. A polyester resin prepared according to the process of claim 1.

* * * * *